(12) United States Patent
Kodali et al.

(10) Patent No.: US 10,645,228 B2
(45) Date of Patent: May 5, 2020

(54) ADAPTABILITY IN EVS CODEC TO IMPROVE POWER EFFICIENCY

(71) Applicant: Apple Inc., Cupertino, CA (US)

(72) Inventors: Sree Ram Kodali, Sunnyvale, CA (US); Mohan Rao Thota, Sunnyvale, CA (US); Manish G. Vemulapalli, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/941,148

(22) Filed: Mar. 30, 2018

(65) Prior Publication Data

US 2018/0376004 A1 Dec. 27, 2018

Related U.S. Application Data

(60) Provisional application No. 62/524,906, filed on Jun. 26, 2017.

(51) Int. Cl.
*H04B 17/00* (2015.01)
*H04M 7/00* (2006.01)
*H04W 24/08* (2009.01)
*H04L 29/06* (2006.01)
*H04M 3/22* (2006.01)

(52) U.S. Cl.
CPC .......... *H04M 7/0072* (2013.01); *H04L 65/80* (2013.01); *H04M 3/2227* (2013.01); *H04W 24/08* (2013.01)

(58) Field of Classification Search
CPC ............................. H04M 7/0072; H04W 24/08
USPC ...................................................... 455/67.13
See application file for complete search history.

(56) References Cited

U.S. PATENT DOCUMENTS

| 5,339,062 | A | * | 8/1994 | Donaldson | .............. | H01F 6/005 |
| | | | | | | 323/360 |
| 7,072,336 | B2 | * | 7/2006 | Barany | ................. | H04L 1/0014 |
| | | | | | | 370/389 |
| 7,158,506 | B2 | * | 1/2007 | Jacobs | .................... | H04L 12/64 |
| | | | | | | 370/352 |
| 7,225,271 | B1 | * | 5/2007 | DiBiasio | ................. | H04L 47/10 |
| | | | | | | 709/224 |
| 7,246,165 | B2 | * | 7/2007 | Williams | ............ | H04L 41/0893 |
| | | | | | | 709/225 |
| 7,391,769 | B2 | * | 6/2008 | Rajkumar | ............... | H04L 12/64 |
| | | | | | | 370/329 |
| 7,394,807 | B2 | * | 7/2008 | Hamiti | ..................... | H04L 69/24 |
| | | | | | | 370/328 |
| 7,477,600 | B1 | * | 1/2009 | Mor | ..................... | H04L 41/0843 |
| | | | | | | 370/231 |
| 7,529,238 | B2 | * | 5/2009 | Fleming | ............ | H04L 29/12009 |
| | | | | | | 370/389 |
| 7,529,675 | B2 | * | 5/2009 | Maes | ...................... | G10L 15/30 |
| | | | | | | 704/270.1 |
| 7,535,835 | B2 | * | 5/2009 | Davies | ................... | H04L 47/10 |
| | | | | | | 370/230 |
| 7,616,658 | B2 | * | 11/2009 | Harada | ................. | H04L 1/0003 |
| | | | | | | 370/465 |

(Continued)

*Primary Examiner* — April G Gonzales
(74) *Attorney, Agent, or Firm* — Kowert Hood Munyon Rankin and Goetzel PC; Jeffrey C. Hood (57) ABSTRACT

This disclosure relates to techniques for codec selection for voice calls. A wireless device may initiate a voice call and may determine one or more link quality indicators. Based at least in part on the one or more link quality indicators, the wireless device may select a codec for the voice call.

20 Claims, 4 Drawing Sheets

(56) References Cited

U.S. PATENT DOCUMENTS

| | | | | |
|---|---|---|---|---|
| 7,701,963 B2* | 4/2010 | Rezaiifar | H04L 12/4633 | 370/351 |
| 7,898,980 B2* | 3/2011 | Kim | H04W 76/12 | 370/254 |
| 7,907,523 B2* | 3/2011 | Koo | G10L 19/24 | 370/230 |
| 7,934,016 B2* | 4/2011 | DiBiasio | H04L 47/10 | 709/224 |
| 8,195,811 B2* | 6/2012 | Williams | H04L 41/0893 | 709/228 |
| 8,380,522 B2* | 2/2013 | Chevallier | H04W 88/181 | 370/335 |
| 8,392,502 B2* | 3/2013 | Henrikson | H04L 29/06 | 370/260 |
| 8,780,720 B2* | 7/2014 | Ramadas | H04L 47/10 | 370/235 |
| 8,913,524 B1* | 12/2014 | Aksu | H04L 65/1069 | 370/254 |
| 8,964,666 B2* | 2/2015 | Marinier | H04L 1/0002 | 370/329 |
| 9,554,309 B2* | 1/2017 | Park | H04W 36/0055 | |
| 9,672,831 B2* | 6/2017 | Assem Aly Salama | G10L 19/0018 | |
| 10,231,256 B2* | 3/2019 | Checko | H04W 76/10 | |
| 10,339,456 B2* | 7/2019 | Hui | G06N 20/00 | |
| 2007/0213038 A1* | 9/2007 | Masseroni | H04B 29/06027 | 455/414.3 |
| 2011/0149905 A1* | 6/2011 | Kim | H04W 36/02 | 370/331 |
| 2012/0088457 A1* | 4/2012 | Johansson | H04W 24/10 | 455/67.11 |
| 2013/0185084 A1* | 7/2013 | Rajendran | G10L 19/04 | 704/500 |
| 2013/0188500 A1* | 7/2013 | He | H04W 28/16 | 370/252 |
| 2013/0344816 A1* | 12/2013 | Niu | H04W 48/16 | 455/67.13 |
| 2014/0254567 A1* | 9/2014 | Han | H04W 76/14 | 370/336 |
| 2014/0369247 A1* | 12/2014 | Sambhwani | H04W 76/28 | 370/311 |
| 2015/0163042 A1* | 6/2015 | Tsuda | H04L 5/0058 | 370/329 |
| 2015/0195748 A1* | 7/2015 | Uchino | H04W 36/0011 | 370/331 |
| 2016/0065339 A1* | 3/2016 | Matsumoto | H04L 5/0048 | 370/329 |
| 2016/0119384 A1* | 4/2016 | Karimli | H04L 65/1069 | 370/252 |
| 2016/0119762 A1* | 4/2016 | Zhu | H04W 76/27 | 370/312 |
| 2016/0219579 A1* | 7/2016 | Yamazaki | H04L 5/0048 | |
| 2016/0227485 A1* | 8/2016 | Davydov | H04W 52/146 | |
| 2016/0249359 A1* | 8/2016 | Yamazaki | H04W 72/044 | |
| 2016/0295516 A1* | 10/2016 | Su | H04L 1/1822 | |
| 2016/0323762 A1* | 11/2016 | Adachi | H04W 16/18 | |
| 2016/0373953 A1* | 12/2016 | Fukuta | H04W 24/10 | |
| 2016/0374050 A1* | 12/2016 | Prasad | H04W 4/06 | |
| 2017/0019892 A1* | 1/2017 | Mitsui | H04W 16/02 | |
| 2017/0164238 A1* | 6/2017 | Paredes Cabrera | H04W 28/22 | |
| 2017/0238320 A1* | 8/2017 | Fukuta | H04W 16/14 | 370/329 |
| 2017/0289319 A1* | 10/2017 | Kwok | H04W 28/16 | |
| 2018/0192303 A1* | 7/2018 | Hui | H04L 65/1016 | |

* cited by examiner

ADAPTABILITY IN EVS CODEC TO IMPROVE POWER EFFICIENCY

PRIORITY CLAIM

This application claims priority to U.S. provisional patent application Ser. No. 62/524,906, entitled "Adaptability in EVS Codec to Improve Power Efficiency," filed Jun. 26, 2017, which is hereby incorporated by reference in its entirety as though fully and completely set forth herein.

FIELD

The present application relates to wireless devices, including to apparatuses, systems and methods for codec selection to improve power efficiency in wireless communication systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

As wireless communication technologies and wireless devices implementing those technologies are developed and updated over time, there can be potential for new or updated features, configurations, software, etc., that increase processing requirements and therefore, increase battery use. While in some circumstances, these changes may provide significant user experience benefits, in other circumstances, such increased processing requirements and battery usage may have a significant negative impact on battery life without significant corresponding user experience benefits. For example, some (e.g., newer) codecs used for voice calls may offer better compression efficiency and/or better sound quality than other (e.g., older) codecs, but these codecs may require more energy use. Thus, the variety of available codecs can make codec selection challenging. Accordingly, improvements in the field are desired.

SUMMARY

Embodiments are presented herein of apparatuses, systems, and methods for codec selection to improve power efficiency in wireless communication systems.

Voice calls may be a common use of wireless devices. Accordingly, many codecs have been developed, and this may continue to be an area of technological change in the future. Many different codecs may be available offering different characteristics. There may be numerous aspects of voice calls that may be influenced by codec selection, including, for example: sound quality, delay or lag, processing requirements, and energy use. It may be possible that any particular codec may have advantages in some of these aspects and disadvantages in other aspects, relative to other available codecs.

An ongoing technology change may be occurring currently, in the form of increasing usage of the Enhanced Voice Services (EVS) codecs. EVS may offer better compression efficiency and better sound quality than adaptive multi-rate (AMR) codecs, at least in some instances. However, these advantages may vary with circumstances and may have associated costs.

The present disclosure includes techniques for selecting codecs for voice calls. According to some embodiments, the techniques described herein may enable a wireless device to realize the benefits of EVS in circumstances wherein those benefits are most significant and to realize the benefits of AMR in circumstances wherein those benefits are most significant. For example, in some embodiments, EVS may be used in circumstances with poor link quality and AMR (e.g., or backwards-compatible EVS IO AMR) may be used in circumstances with good link quality. One or more link quality indicators may be determined, and may be used as a basis for selecting a codec for a voice call.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
RAN: Radio Access Network
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
E-UTRAN: Evolved UMTS Radio Access Network or Evolved Universal Radio Access Network
RRC: Radio Resource Control
EVS: Enhanced Voice Services
AMR: Adaptive Multi-rate
PCM: Pulse Code Modulation
MIPS: Millions of Instructions Per Second
CMR: Codec Mode Request
dbm: decibel-milliwatt
db: decibel Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 1:
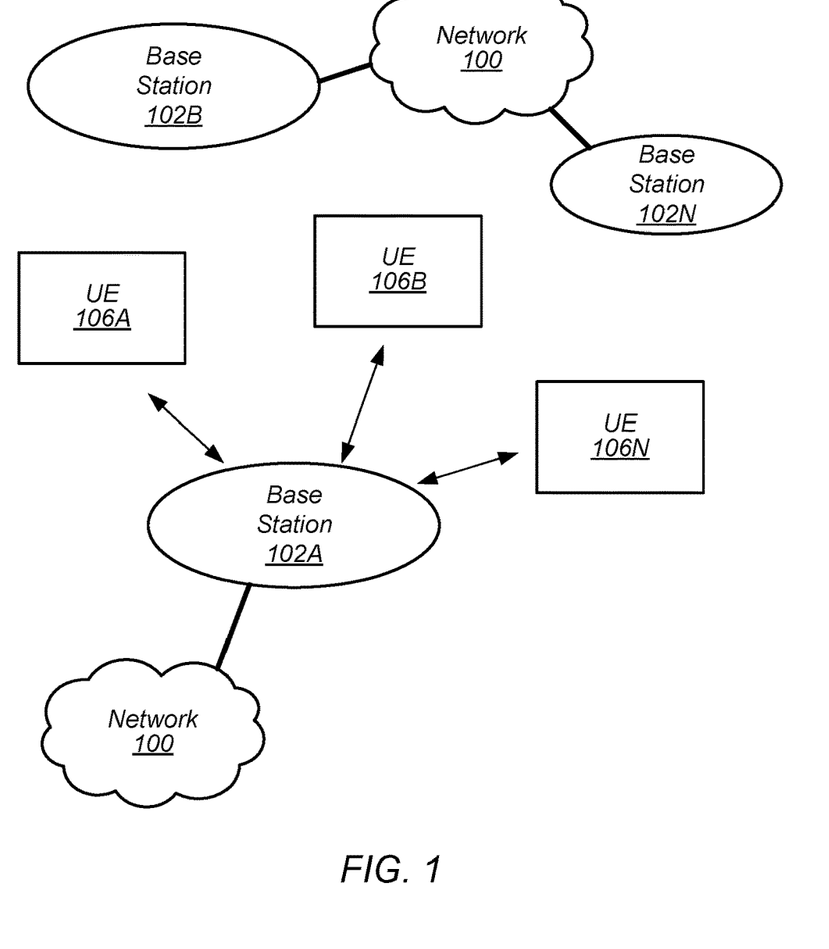
FIG. 1 illustrates an exemplary (and simplified) wireless communication system, according to some embodiments.
Figure 2:
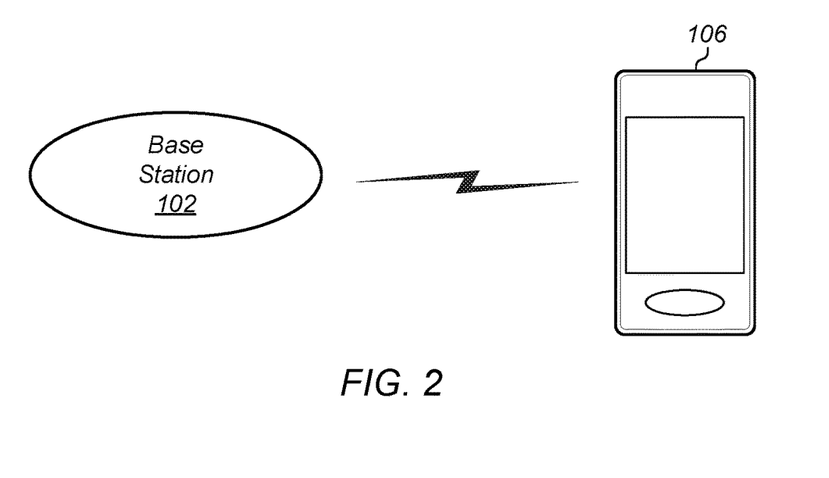
FIG. 2 illustrates a base station (BS) in communication with a user equipment (UE) device, according to some embodiments.

FIGS. 1-2—Communication System

FIG. 1 illustrates an exemplary (and simplified) wireless communication system in which aspects of this disclosure may be implemented, according to some embodiments. For example, any or all of the wireless devices illustrated in FIG. 1 may be configured for codec selection, e.g., according to the method of FIG. 5. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware and/or software that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 5G NR, 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
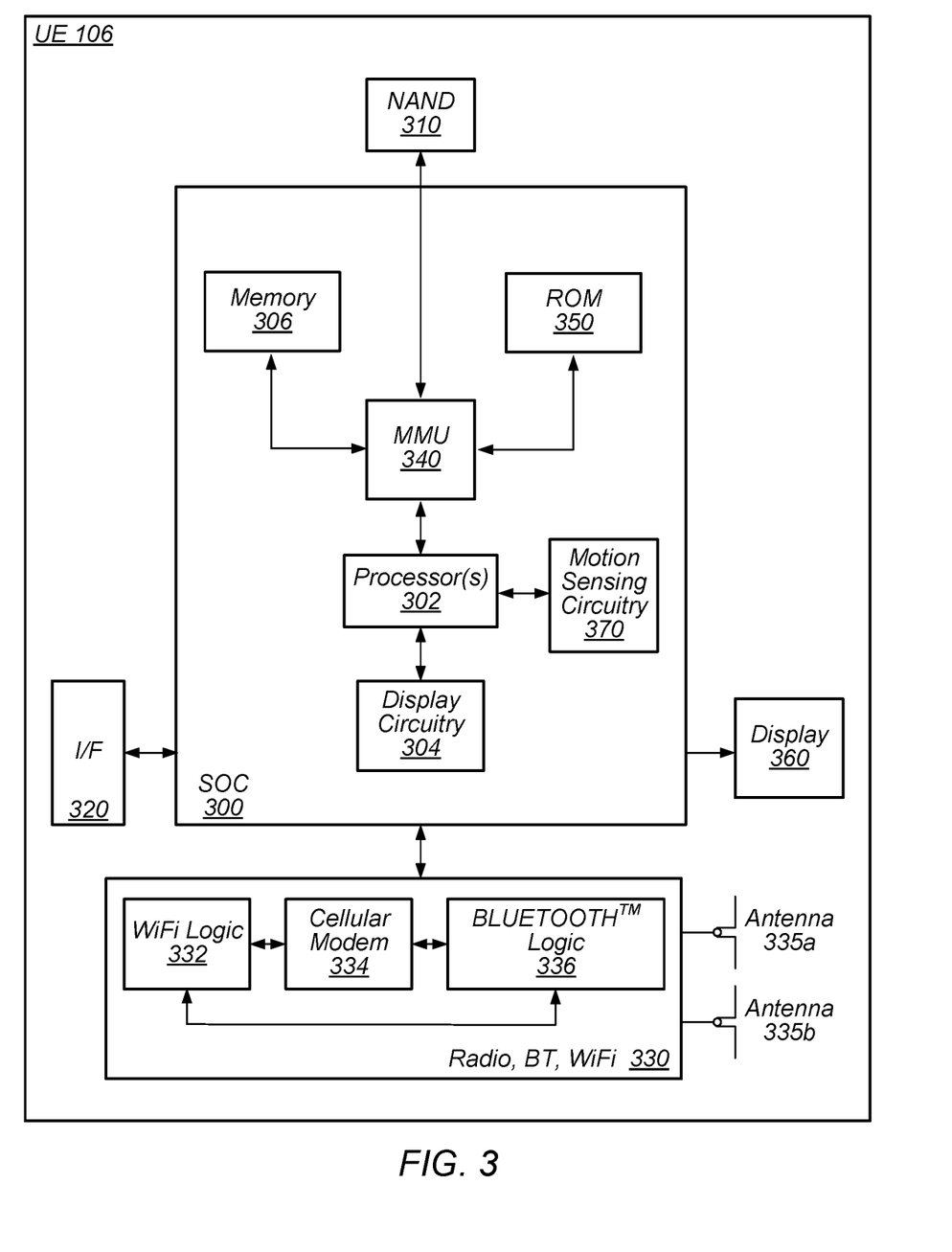
FIG. 3 illustrates an exemplary block diagram of a UE, according to some embodiments.

FIG. 3—Block Diagram of a UE Device

FIG. 3 illustrates one possible block diagram of a UE device 106. As shown, the UE device 106 may include a system on chip (SOC) 300, which may include portions for various purposes. For example, as shown, the SOC 300 may include processor(s) 302 which may execute program instructions for the UE device 106, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106 may include at least one antenna, and in some embodiments multiple antennas (e.g., antennas 335a and 335b), for performing wireless communication with base stations and/or other devices. For example, the UE device 106 may use antennas 335a and 335b to perform the wireless communication. As noted above, the UE device 106 may in some embodiments be configured to communicate wirelessly using a plurality of wireless communication standards or radio access technologies (RATs). The UE device 106 may include any number of antennas.

The wireless communication circuitry 330 may include Wi-Fi Logic 332, a Cellular Modem 334, and Bluetooth Logic 336. The Wi-Fi Logic 332 is for enabling the UE device 106 to perform Wi-Fi communications on an 802.11 network. The Bluetooth Logic 336 is for enabling the UE device 106 to perform Bluetooth communications. The cellular modem 334 may be a lower power cellular modem capable of performing cellular communication according to one or more cellular communication technologies.

As described herein, UE 106 may include hardware and software components for implementing embodiments of this disclosure. For example, one or more components of the wireless communication circuitry 330 (e.g., cellular modem 334) of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
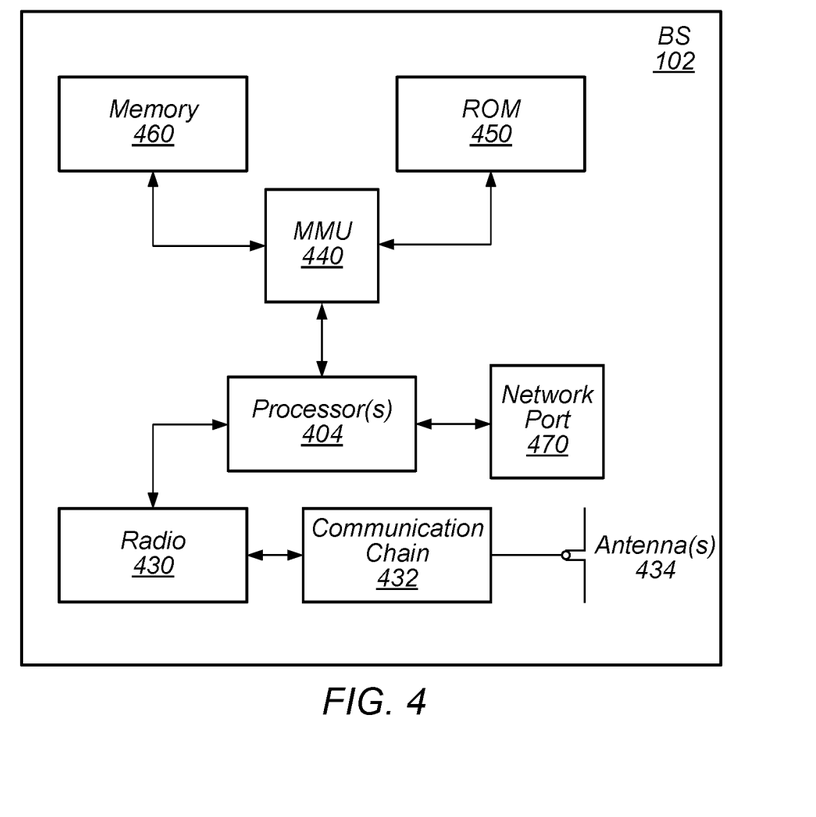
FIG. 4 illustrates an exemplary block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
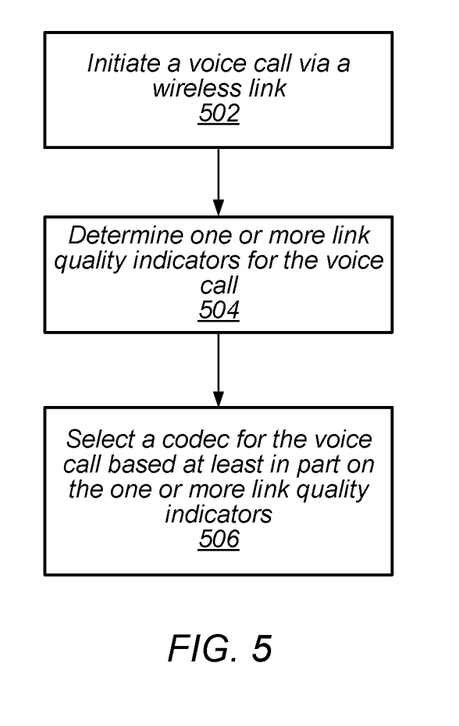
FIG. 5 is a flow chart diagram illustrating an exemplary method for codec selection to improve power efficiency in wireless communication systems, according to some embodiments.

FIG. 5—Codec Selection to Improve Power Efficiency

Voice calling may be an important feature of wireless devices. Accordingly, many codecs have been developed, e.g., with the goal of improving voice calling, and this may continue to be an area of technological change in the future.

There are numerous aspects of voice calls that may be influenced by codec selection, including, for example: sound quality, delay or lag, processing requirements, and energy use. It may be possible that any particular codec can have advantages in some of these aspects and disadvantages in other aspects. For example, it may be possible that one (e.g., new) codec achieves benefits in sound quality at a cost of increased energy use relative to another (e.g., previous) codec. Further, it is possible that different codecs may exhibit variable benefits for one or more of these aspects depending on conditions, such as link quality.

One technology change in this area has been the transition from Adaptive Multi-Rate (AMR) narrowband (AMR-NB) to AMR wideband (AMR-WB). This change in codec may have created significant audio quality improvements for some voice calls. For example, voice calls that utilize AMR-WB may commonly be rated with higher scores according to various measures of audio quality, such as Perceptual Objective Listening Quality Assessment (POLQA), among various possible audio quality measurement techniques. At least in some instances, AMR-NB and AMR-WB may be used in Voice over LTE (VoLTE) calls.

A further technology change in this area may include increasing usage of Enhanced Voice Services (EVS) codecs. EVS codecs may also or alternatively be used in VoLTE calls, at least in some instances. There may be several EVS codecs, which include, for example, EVS Primary (also referred to herein simply as "EVS"), EVS-Channel Aware (EVS-CA), and EVS AMR-WB Inter-Operable mode (EVS IO AMR).

EVS Primary may offer better compression efficiency than AMR codecs, e.g., such that more (e.g., Pulse Code Modulation (PCM)) samples can be included in each audio packet. Further, EVS may be designed to provide improvements to sound quality, e.g., by potentially providing improved selection of samples that are important to audio quality relative to AMR, at least in some instances. Accordingly, EVS may offer improved sound quality at the same bit rate as AMR-WB, in some instances. However, depending on the type of audio data being transmitted, the degree to which the improved sound quality of EVS is noticeable to a user may vary. For example, in some instances, a greater difference in audio quality (e.g., as measured by POLQA or other audio quality metrics, as desired) may be noticeable between EVS and AMR-WB for music than for speech. This may result, at least in part, from differences between the typical frequency ranges for everyday human speech in comparison to the typical frequency ranges for music audio signals.

EVS-CA may include similar compression efficiency and sample selection characteristics as EVS Primary, but where EVS Primary does not utilize sample redundancy between data packets, EVS-CA may include (e.g., repeated/redundant) samples from previous packets (e.g., the N-2 and/or N-3 packets) into the current (e.g., Nth) packet. Thus, EVS-CA may provide an advantage over EVS Primary and other codecs that do not include such redundancy under imperfect (e.g., poor) link quality conditions, e.g., because if an EVS-CA packet is lost, some of the important PCM samples of that packet may be recovered from another EVS-CA packet. However, in good link quality conditions (e.g., with minimal packet loss), there may be less or no benefit from this feature, and EVS Primary may provide better (or equivalent) audio quality relative to EVS-CA.

EVS IO AMR may be backwards-compatible with AMR codecs, and may include compression efficiency more similar to legacy AMR codecs. Due to its lower (e.g., in comparison to other EVS codecs) compression rate, EVS IO AMR may require lower processing power (e.g., fewer required Millions of Instructions Per Second, or "MIPS"), and thus use battery energy more efficiently. Therefore, EVS IO AMR may provide power efficiency and battery life advantages. These features may be particularly beneficial in circumstances in which the potential benefits of other EVS codecs may not be significantly realized, such as when link quality is good and the audio quality differences may be less noticeable (e.g., due to characteristics of the audio signals).

In some circumstances, the increased energy (e.g., battery or power) cost of the higher compression ratios of EVS relative to AMR (e.g., or EVS IO AMR) may be approximately 40%. Other values are also possible. This increased energy cost may be observed in both the UL (e.g., compression) direction and the DL (e.g., decompression) direction.

FIG. 5 is a flowchart diagram illustrating one possible embodiment of a scheme to select a codec for voice calls. According to some embodiments, use of the codec selection scheme depicted in FIG. 5 may result in a wireless device realizing the benefits of EVS-CA in circumstances when those benefits are most significant and realizing the benefits of EVS IO AMR in circumstances when those benefits are most significant. Aspects of the method of FIG. 5 may be implemented by a wireless device such as a UE 106 illustrated in various of the Figures herein, or more generally in conjunction with any of the computer systems or devices shown in the above Figures, among other devices, as desired.

In various embodiments, some of the elements of the method shown may be performed concurrently, in a different order than shown, may be substituted for by other method elements, or may be omitted. Additional elements may also be performed as desired. As shown, the method may operate as follows.

The wireless device (e.g., UE 106) may initiate a voice call over a wireless link (502). Note that the wireless device may originate the call or may receive the call, e.g., the call may be originated by a user of a different device. The call may include one or more other endpoints, e.g., the call may be a two-way call, a three-way call, a conference call, or other type of multi-way call.

The wireless link may operate according to any of a variety of possible wireless communication technologies including LTE, GSM, Bluetooth, or WLAN, among other possibilities. The wireless link may include multiple wireless communication technologies, e.g., WLAN and cellular. The wireless link may change during the call.

The voice call may include multiple hops, which may include multiple wireless and/or wired links, that may operate according to any of various possible communication technologies. For example, the wireless device may be an accessory device communicating via Bluetooth with a companion device which in turn communicates with a BS (e.g., BS 102) using LTE.

The user or users of the other devices participating in the call may be connected in any of numerous possible ways, including via a circuit-switched connection to the PSTN, using a computer, via LTE, etc.

The voice call can be any type of call including audio transmissions. For example, the voice call may include video or other features (e.g., a game) in addition to audio transmissions. In some instances, the voice call may be an emergency call.

The wireless device may determine one or more link quality indicators of the voice call (504). The one or more link quality indicators may include one or more indicators measured or otherwise obtained by the device directly, and/or may include one or more indicators reported to the device (e.g., by/via BS 102). In some instances, devices comprising other endpoints of the voice call may report one or more link quality indicators which may be transmitted to the wireless device.

The link quality indicators may relate to any portion of the link between the wireless device and one or more other endpoints of the voice call, e.g., including first-hop metrics relating to the wireless link and/or end-to-end metrics encompassing any or all intermediate links between the wireless device and the other endpoint(s) of the voice call.

In some instances, the one or more link quality indicators may include indicators or metrics for one or more communication layers, including, for example, physical layer metrics for the wireless link. Non-limiting examples of physical layer metrics may include: received signal strength indicator (RSSI), reference signal received power (RSRP), reference signal received quality (RSRQ), signal to noise ratio (SNR), signal to interference plus noise ratio (SINR), Ec/Io, etc. for the wireless link.

The one or more link quality indicators for the voice call may include either or both of uplink quality indicators or downlink quality indicators. In some embodiments, uplink quality indicators may be inferred from downlink quality indicators, or vice versa. For example, RSRP or SNR may be measured by the wireless device. These metrics may directly indicate information about downlink quality for the wireless link. These metrics may be used to infer information about uplink quality (e.g., link quality indicators) for the wireless link (e.g., if the same air interface is used for uplink and downlink communications, and/or if such metrics are otherwise considered also relevant to the uplink air interface). For example, in an instance wherein the wireless device is far from the BS (e.g., BS 102), RSRP may be less than −110 dBm and or SNR may be less than −4 dB, as one possibility. The wireless device may use these indicators directly as link quality indicators and/or to infer uplink quality indicators. Additionally or alternatively, in some embodiments, downlink quality indicators may be inferred from uplink quality indicators.

As previously noted, in some instances the one or more link quality indicators may include one or more end-to-end metrics. The wireless device may receive information (e.g., a report) about such end-to-end metrics from another device. Such end-to-end metrics may include a real-time transfer protocol (RTP) packet loss rate, as one possibility. One or more Real-time Control Protocol (RTCP) Receiver Reports (RTCP RR) may be received by the wireless device, and each such RTCP RR may indicate the RTP packet loss rate, e.g., for the time period encompassed by the respective RTCP RR. For example, a lower RTP packet loss rate may be indicative of a higher link quality, in some instances.

In some instances, the one or more link quality indicators for the voice call may include one or more higher layer metrics associated with the wireless link, such as a hybrid automatic repeat request (HARQ) retransmission rate for the wireless link, or a packet data convergence protocol (PDCP) discard rate for the wireless link. The wireless device may be able to determine or estimate the UL PDCP discard rate based on the timing of UL grants. For example, if the wireless device is not awarded an UL grant within a certain amount of time (e.g., 100 ms, 150 ms, or any other configured value), the wireless device may determine that the relevant packet or packets (e.g., that would have been transmitted in response to a UL grant) are discarded. At least in some instances, a lower HARQ retransmission rate and/or a lower PDCP discard rate may be indicative of a higher link quality.

The one or more link quality indicators for the voice call may comprise one or more Block Error Rates (BLER). BLER may be determined for one or more of physical downlink shared channel (PDSCH), physical downlink control channel (PDCCH) or other channels. At least in some instances, higher block error rates may be considered indicative of poorer link quality.

The wireless device may select a codec for the voice call based at least in part on the one or more link quality indicators (506). For example, the wireless device may tend to select a codec with redundancy (e.g., that includes samples from one or more previous data packets in each data packet) when link quality for the voice call is poor (e.g., when one or more conditions associated with poor link quality are met). As choosing such a codec may help mitigate potential packet loss from the poor link quality, this may result in improved audio quality relative to other possible codec choices that do not include such redundancy.

For example, in some embodiments, the wireless device may select the EVS-CA codec in scenarios where the one or more link quality indicators may indicate that the wireless device may be far from a BS. As one such possibility, if one or more physical layer metrics are lower than one or more relevant thresholds, the wireless device may select EVS-CA. Non-limiting examples of such physical layer metrics and possible thresholds include RSRP less than −110 dbm and/or SNR less than −4 db.

As another example, the wireless device may select the EVS-CA codec in scenarios where the one or more link quality indicators may indicate significant lag or packet loss. As one such possibility, if the UL PDCP discard rate is greater than a threshold, e.g., greater than 1%, the wireless device may select EVS-CA.

As a still further example, the wireless device may select the EVS-CA codec in scenarios where the one or more link quality indicators may indicate that the end to end link quality is poor. For example, in the case that an RTCP RR report from the other party (e.g., or multiple parties) to the voice call indicates that RTP packet loss for the other party (or parties) is significant (e.g., is high or is above a threshold), EVS-CA may be selected.

Note that the wireless device may also consider additional factors in selecting a codec. For example, the wireless device may consider the compression rate of each of the codecs in the plurality of possible codecs. As another possibility, the wireless device may consider the amount of remaining energy in the battery of the wireless device. For example, if the battery level is below a threshold, the wireless device may select EVS IO AMR even if one or more link quality indicators indicate that link quality is poor. For example, based on a low battery level, the wireless device may adjust a threshold for using EVS-CA vs. EVS IO AMR (e.g., downward, so that EVS IO AMR is used in marginal link quality conditions).

In some embodiments, the wireless device may select a codec with a lower compression rate (e.g., EVS IO AMR) when the one or more link quality indicators indicate that the link quality is good. For example, in the case that an RTCP RR report from the other party (e.g., or multiple parties) to the voice call indicates that packet loss is insignificant (e.g., is low or is below a threshold), EVS IO AMR may be selected in order to use battery power efficiently.

Alternatively, the wireless device may select a codec with a similar compression rate but without redundancy (e.g., EVS Primary) when the one or more link quality indicators indicate that the link quality is good. For example, in the case that an RTCP RR report from the other party (e.g., or multiple parties) to the voice call indicates that packet loss is insignificant (e.g., is low or is below a threshold), EVS Primary may be selected in order to improve audio quality. In various instances, codec selection may additionally or alternatively be based on any number of other considerations, such as a type of audio (e.g., music, speech, etc.) currently being transmitted in the voice call. For example, EVS primary may be used (e.g., rather than EVS IO AMR) if link quality is good and music is being transmitted.

In some embodiments, the wireless device may be configured to change between codecs autonomously (e.g., automatically), at least for uplink communications of the voice call, based at least in part on the one or more link quality indicators. For downlink communications of the voice call, if a different codec is desired (e.g., based on the one or more link quality indicators), the wireless device may be configured to transmit a Codec Mode Request (CMR). For example, if downlink RTP packet loss is greater than a threshold, e.g., greater than 1%, the wireless device may transmit a CMR requesting that the other device (e.g., or devices) use a codec that includes sample redundancy between data packets, such as EVS-CA. This may allow the wireless device to achieve higher call quality, e.g., as the redundant PCM samples may (e.g., at least partially) mitigate the possible negative impact of the downlink RTP packet loss.

Alternatively to the prior example, in scenarios where the one or more link quality indicators indicate that the downlink link quality is good (e.g., downlink RTP packet loss is less than a threshold, physical layer metrics are above the desired threshold(s), etc.), the wireless device may issue a CMR requesting that the other device (e.g., or devices) use a codec that does not include sample redundancy between data packets, such as EVS Primary or EVS IO AMR instead of EVS-CA. This may allow the wireless device to improve sound quality (e.g., in the case of EVS Primary, in some instances) or use battery energy more efficiently due to lower processing demand (e.g., lower MIPS) (e.g., in the case of EVS IO AMR, in some instances), relative to using EVS-CA.

The wireless device may also be configured to receive CMRs and to select a codec based at least in part on a received CMR.

In some embodiments, steps 504 and 506 may be repeated indefinitely, e.g., over the course of the voice call and/or during other voice calls. For example, the wireless device may continuously or occasionally (e.g., or periodically and/or based on one or more configured triggers) monitor the one or more link quality indicators and may change from one codec to another based at least in part on the one or more link quality indicators. This may allow the wireless device to respond to changing conditions by selecting a different codec. Among various possible examples, the wireless device may change codecs as the distance between the wireless device and a serving BS changes, e.g., EVS-CA may be used while the wireless device is far from the BS, but EVS IO AMR or EVS Primary may be used while the wireless is close to the BS. Similarly, as a further example, the wireless device may change codecs in response to changes associated with other parties to the voice call. For example, if another party's connection quality changes, one or more link quality indicators associated with end-to-end link quality may change. Based at least in part on determining such changes in the one or more link quality indicators (e.g., a change in RTP packet loss) the wireless device may select a different codec.

As noted above, the elements of FIG. 5 may be performed in a different order than shown. For example, one or more link quality indicators may be determined prior to initiating a call, according to some embodiments. Such indicators may be used in conjunction with codec selection prior to or during call initiation, for example.

In the following further exemplary embodiments are provided.

One set of embodiments may include a method, comprising: by a wireless device: initiating a voice call via a wireless link, determining one or more link quality indicators for the voice call, and selecting a codec for the voice call from a plurality of possible codecs, wherein the codec is selected based at least in part on the one or more link quality indicators for the voice call.

According to some embodiments, the method further comprises: receiving a Real-time Control Protocol (RTCP) Receiver Report (RTCP RR) for the voice call, wherein the one or more link quality indicators for the voice call comprise a real-time transfer protocol (RTP) packet loss rate, wherein the RTP packet loss rate is indicated in the RTCP RR.

According to some embodiments, the method further comprises: determining that the one or more link quality indicators for the voice call have changed and selecting a different codec for the voice call based at least in part on determining that the one or more link quality indicators for the voice call have changed.

According to some embodiments, selecting a codec for the voice call from a plurality of possible codecs comprises selecting a codec (e.g., EVS-CA) that includes samples from one or more previous data packets in each data packet when the one or more link quality indicators for the voice call are indicative of poor link quality.

According to some embodiments, the method further comprises: determining that one or more of the one or more link quality indicators for the voice call are below one or more thresholds, and selecting a codec that includes samples from one or more previous data packets in each data packet based on determining that one or more of the one or more link quality indicators for the voice call are below one or more thresholds.

According to some embodiments of the method, the one or more link quality indicators for the voice call comprise one or more physical layer metrics for the wireless link.

According to some embodiments, the one or more physical layer metrics comprise one or more of: reference signal received power (RSRP) for the wireless link, or signal to noise ratio (SNR) for the wireless link.

According to some embodiments, the one or more link quality indicators for the voice call comprise one or more of: a hybrid automatic repeat request (HARD) retransmission rate for the wireless link, or a packet data convergence protocol (PDCP) discard rate for the wireless link.

According to some embodiments, the one or more link quality indicators for the voice call comprise one or more end-to-end metrics for the voice call.

According to some embodiments, the method further comprises: determining that the one or more link quality indicators are indicative of poor downlink link quality for the voice call, and transmitting a Codec Mode Request (CMR), wherein the CMR is based on the one or more call quality indicators. A CMR may request another party to switch between different codecs (e.g., to switch to EVS-CA from EVS IO AMR).

According to some embodiments, the codec is selected further based on the compression rate of the codec.

According to some embodiments, the plurality of possible codecs comprises one or more of: Enhanced Voice Services (EVS); EVS-Channel Aware (EVS-CA); Adaptive Multi-Rate (AMR); AMR-Wideband (AMR-WB); AMR-Narrowband (AMR-NB); or EVS AMR-WB Inter-Operable mode (EVS IO AMR).

One set of embodiments may include a method, comprising: by a wireless device, modifying a Radio Link Monitoring (RLM) boundary (e.g., by changing PDSCH BLER rate or PDCCH BLER rate thresholds) to trigger Radio Link Failure (RLF) based at least in part on the codec that is currently used for the voice call. Such a method may recognize that different codecs can provide adequate call quality under different conditions. For example, EVS-CA can out-perform EVS IO AMR audio quality under some conditions (e.g., when wireless device is far from a serving BS). So, RLM boundary may be extended for EVS-CA (e.g., an RLM PDSCH BLER threshold can be different (e.g., higher) than for EVS IO AMR or AMR codecs). For example, it may be possible that an RLM PDSCH BLER threshold can be as high as 40% or 50% for EVS-CA, but an appropriate RLM PDSCH BLER threshold may be 10% for AMR. Such thresholds may be configured as desired. In other words, using an AMR codec, RLF may be triggered based on a 10% BLER, but using EVS-CA, RLF may not be triggered unless BLER reaches 40% or 50%. One potential benefit of such a method is to avoid or minimize the need for re-initiation of the voice call following RLF, e.g., because triggering RLF may lead to a dropped call, which then may be re-initiated.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a wireless device:
initiating a voice call via a wireless link;
determining one or more link quality indicators of the voice call via the wireless link, wherein the one or more link quality indicators comprise reference signal received power (RSRP); and selecting a codec for the voice call via the wireless link from a plurality of possible codecs, wherein the codec is selected based at least in part on the RSRP, wherein a codec that includes samples from one or more previous data packets in each data packet is selected when the one or more link quality indicators are indicative of poor link quality of the wireless link.

2. The method of claim 1, the method further comprising:
receiving a Real-time Control Protocol (RTCP) Receiver Report (RTCP RR) for the voice call, wherein the one or more link quality indicators of the voice call comprise a real-time transfer protocol (RTP) packet loss rate, wherein the RTP packet loss rate is indicated in the RTCP RR, wherein the codec is further selected based at least in part on the RTP packet loss rate.

3. The method of claim 1, the method further comprising:
determining that at least one link quality indicator of the voice call has changed; and
selecting a different codec for the voice call based at least in part on determining that at least one link quality indicator of the voice call has changed.

4. The method of claim 1,
wherein selecting a codec for the voice call from the plurality of possible codecs comprises selecting a codec that does not include samples from previous data packets in each data packet when the one or more link quality indicators of the voice call are indicative of good link quality.

5. The method of claim 1, the method further comprising:
determining that one or more of the one or more link quality indicators of the voice call are below one or more thresholds; and
selecting a codec that includes samples from one or more previous data packets in each data packet based on determining that one or more of the one or more link quality indicators of the voice call are below the one or more thresholds.

6. The method of claim 1,
wherein the one or more link quality indicators of the voice call further comprise signal to noise ratio (SNR) for the wireless link, wherein the codec is further selected based at least in part on the SNR.

7. The method of claim 1,
wherein the plurality of possible codecs comprises one or more of:
Enhanced Voice Services (EVS) Primary;
EVS-Channel Aware (EVS-CA);
Adaptive Multi-Rate Wideband (AMR-WB);
AMR-Narrowband (AMR-NB); or
EVS AMR-WB Inter-Operable mode (EVS IO AMR).

8. The method of claim 1,
wherein the one or more link quality indicators of the voice call comprise one or more end-to-end metrics for the voice call.

9. The method of claim 1, the method further comprising:
determining that the one or more link quality indicators of the voice call are indicative of poor downlink link quality for the voice call; and
transmitting a Codec Mode Request (CMR), wherein the CMR is based on the one or more link quality indicators of the voice call.

10. The method of claim 1, the method further comprising:
extending a radio link monitoring boundary based at least in part on the selected codec, wherein the selected codec comprises a channel aware codec.

11. A wireless device, comprising:
an antenna;
a radio coupled to the antenna; and
a processor coupled to the radio;
wherein the radio and the processor are configured to:
establish a wireless link with a base station;
initiate a voice call via the wireless link;
determine, based on timing of at least one uplink grant, an uplink packet data convergence protocol (PDCP) discard rate for the wireless link; and
select a codec for the voice call, wherein the codec is selected based at least in part on the PDCP discard rate for the wireless link.

12. The wireless device of claim 11, wherein the radio and the processor are further configured to determine a hybrid automatic repeat request (HARQ) retransmission rate for the wireless link, wherein the codec is selected based at least in part on the HARQ retransmission rate.

13. The wireless device of claim 11,
wherein the codec is selected further based at least in part on a battery level of the wireless device.

14. The wireless device of claim 11,
wherein the codec is selected further based at least in part on a compression rate of the codec.

15. The wireless device of claim 11, wherein the processor is further configured to cause the wireless device to:
modify a radio link monitoring boundary based at least in part on the selected codec.

16. An apparatus comprising:
a processor, wherein the processor is configured to cause a wireless device to:
initiate a voice call, wherein to initiate the voice call comprises either originating or receiving the voice call;
determine a link quality indicator associated with the voice call, wherein the link quality indicator comprises reference signal received power (RSRP); and
select a codec for the voice call based at least in part on the RSRP, wherein a first codec that excludes sample redundancy is selected when the RSRP is above a threshold.

17. The apparatus of claim 16,
wherein if the RSRP is below the threshold a codec that includes sample redundancy is selected.

18. The apparatus of claim 16, wherein to determine the link quality indicator, the processor is further configured to cause the wireless device to:
receive a report from another device; and
determine the link quality indicator based at least in part on information indicated in the report.

19. The apparatus of claim 16,
wherein the link quality indicator further comprises a block error rate.

20. The apparatus of claim 16, wherein the processor is further configured to cause the wireless device to:
modify a radio link monitoring boundary based at least in part on the selected codec.

* * * * *